US012659372B2

(12) United States Patent
Wang et al.

(10) Patent No.: US 12,659,372 B2
(45) Date of Patent: Jun. 16, 2026

(54) LINKAGE SYSTEM, METHOD, VEHICLE, STORAGE MEDIUM AND CHIP

(71) Applicant: XIAOMI EV TECHNOLOGY CO., LTD., Beijing (CN)

(72) Inventors: Yanjiong Wang, Beijing (CN); Chengping Hua, Beijing (CN)

(73) Assignee: XIAOMI EV TECHNOLOGY CO., LTD., Beijing (CN)

( * ) Notice: Subject to any disclaimer, the term of this patent is extended or adjusted under 35 U.S.C. 154(b) by 242 days.

(21) Appl. No.: 18/216,952

(22) Filed: Jun. 30, 2023

(65) Prior Publication Data

US 2024/0323256 A1     Sep. 26, 2024

(30) Foreign Application Priority Data

Mar. 20, 2023     (CN) .......................... 202310278470.3

(51) Int. Cl.
*H04L 67/12*     (2022.01)
*B60R 16/023*     (2006.01)

(52) U.S. Cl.
CPC ............ *H04L 67/12* (2013.01); *B60R 16/023* (2013.01)

(58) Field of Classification Search
CPC ... H04L 67/12; H04L 2209/84; H04L 67/125; B60R 16/023; G05B 2219/24065; G05B 19/418; G06F 30/20; G06F 13/00; G06F 9/50; G06F 16/903; H04W 4/48
USPC ........................................................ 709/224
See application file for complete search history.

(56) References Cited

U.S. PATENT DOCUMENTS

| | | | |
|---|---|---|---|
| 7,092,799 B2 * | 8/2006 | Oesterling | .......... B60R 16/0231 |
| | | | 701/32.7 |
| 7,689,325 B2 * | 3/2010 | Farrow | ................. H04W 88/06 |
| | | | 701/1 |
| 8,855,575 B2 * | 10/2014 | Heines | ...................... G06F 8/70 |
| | | | 455/66.1 |
| 9,807,225 B2 * | 10/2017 | Zörb-Schliefer | .......................... |
| | | | H04M 1/72448 |

(Continued)

FOREIGN PATENT DOCUMENTS

| | | |
|---|---|---|
| CN | 110377004 B | 8/2020 |
| CN | 113868868 A | 12/2021 |

(Continued)

OTHER PUBLICATIONS

European Patent Application No. 23184445.7, Search and Opinion Dec. 15, 2023, 8 pages.

(Continued)

*Primary Examiner* — Sargon N Nano
(74) *Attorney, Agent, or Firm* — Cozen O'Connor

(57)     ABSTRACT

A linkage system includes an object model device, a non-object model device and a main control device; the object model device is configured to model a function of the object model device to obtain a first object model with a first parameter; the main control device is configured to model a function of the main control device to obtain a second object model, and model a function of the non-object model device to obtain a third object model; the second object model has a second parameter and the third object model has a third parameter; the main control device is further configured to drive at least one of the object model device, the non-object model device and the main control device in response to determining that a target parameter is changed or triggered.

17 Claims, 2 Drawing Sheets

(56) References Cited

U.S. PATENT DOCUMENTS

| | | | |
|---|---|---|---|
| 9,853,905 | B2 * | 12/2017 | Chen ........................ H04W 8/24 |
| 10,191,794 | B2 * | 1/2019 | Smith ...................... H04L 43/04 |
| 10,268,524 | B2 * | 4/2019 | Sainaney ................ G06F 9/542 |
| 10,654,477 | B2 * | 5/2020 | Katoh ....................... B62D 1/28 |
| 10,686,882 | B2 * | 6/2020 | Eberlein ............... H04L 41/145 |
| 10,691,508 | B2 * | 6/2020 | Schroeder ........... G06F 9/45504 |
| 11,254,324 | B2 * | 2/2022 | Ke ...................... B60W 50/029 |
| 12,515,709 | B2 * | 1/2026 | Chinthalapudi .. B60W 60/0018 |
| 2012/0013457 | A1 * | 1/2012 | Dowling ............. G07C 5/0816 |
| | | | 348/148 |
| 2014/0157244 | A1 * | 6/2014 | Windley ................... G06F 8/40 |
| | | | 717/139 |
| 2014/0200739 | A1 * | 7/2014 | Kirsch ................... H04L 67/12 |
| | | | 701/1 |
| 2014/0309861 | A1 * | 10/2014 | Lind ..................... B60R 16/037 |
| | | | 715/745 |
| 2016/0236614 | A1 * | 8/2016 | Heo ......................... B60Q 9/00 |
| 2017/0083386 | A1 * | 3/2017 | Wing ..................... G06Q 10/10 |
| 2017/0195474 | A1 * | 7/2017 | Yae ...................... H04B 1/3822 |
| 2018/0124183 | A1 * | 5/2018 | Kozat ................. H04L 41/0894 |
| 2018/0248954 | A1 * | 8/2018 | Raji ........................ H04L 67/12 |
| 2018/0292098 | A1 * | 10/2018 | Bandyopadhyay .......................... G05B 19/0426 |
| 2019/0020718 | A1 * | 1/2019 | Mathews ................ H04L 67/55 |
| 2019/0379706 | A1 * | 12/2019 | Verma ................ H04L 67/1097 |
| 2021/0044955 | A1 * | 2/2021 | Lu ........................ G06F 16/9535 |
| 2023/0256968 | A1 * | 8/2023 | Baek .................... B60W 50/14 |
| | | | 701/96 |

FOREIGN PATENT DOCUMENTS

| | | |
|---|---|---|
| JP | 2010154203 A | 7/2010 |
| JP | 2015076686 A | 4/2015 |

OTHER PUBLICATIONS

Japanese Patent Application No. 2023189600, Office Action dated Sep. 3, 2024, 3 pages.

Japanese Patent Application No. 2023189600, English translation of Office Action dated Sep. 3, 2024, 3 pages.

* cited by examiner main control device function 1    ...    function n second object model linkage engine first object model mapping    ...    third object model first object model function 1    ...    function n object model device function 1    ...    function n non-object model device

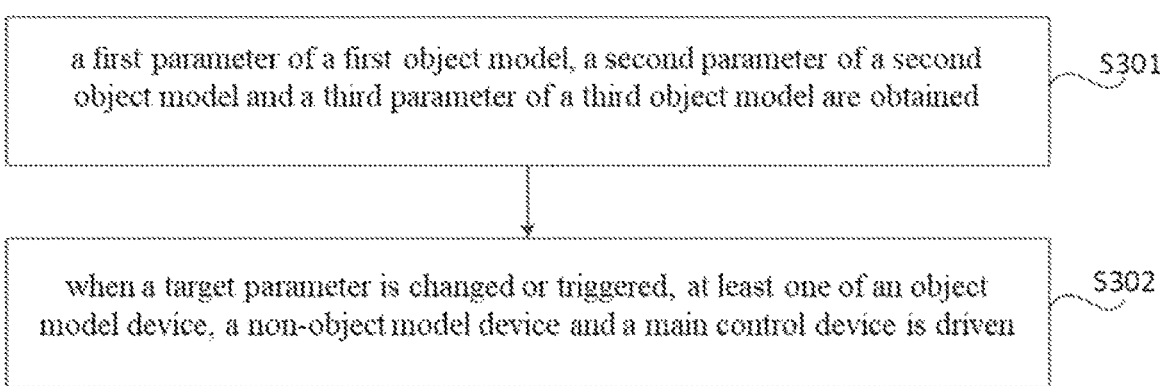

a first parameter of a first object model, a second parameter of a second object model and a third parameter of a third object model are obtained         S301 when a target parameter is changed or triggered, at least one of an object model device, a non-object model device and a main control device is driven         S302

Fig. 3

| infotainment system | sensing system |
|---|---|
| 610 | 620 |

| decision control system | drive system |
|---|---|
| 630 | 640 |

600

650 computing platform

651 processor

652 memory

653 instructions

LINKAGE SYSTEM, METHOD, VEHICLE, STORAGE MEDIUM AND CHIP

CROSS-REFERENCE TO RELATED APPLICATIONS

The present application claims the benefit of priority to Chinese Application No. 202310278470.3, filed on Mar. 20, 2023, the contents of which are incorporated herein by reference in their entireties for all purposes.

BACKGROUND

In interconnection scenarios, devices are linked through interconnection to realize related functions. For example, when linking devices to a vehicle, the communication protocols of some devices may not be applicable to the vehicle or other devices, which will lead to failure of interconnection and linkage between these devices, and thus the related functions cannot be realized.

SUMMARY

The present disclosure relates to a field of interconnection technology, in particular to a linkage system, a method, a vehicle, a storage medium and a chip.

A linkage system according to embodiments of the present disclosure includes an object model device, a non-object model device and a main control device. The object model device is configured to model a function of the object model device to obtain a first object model, and the first object model has a first parameter. The main control device is configured to model a function of the main control device to obtain a second object model, and model a function of the non-object model device to obtain a third object model; the second object model has a second parameter, and the third object model has a third parameter. The main control device is further configured to drive at least one of the object model device, the non-object model device and the main control device when a target parameter is changed or triggered; the target parameter is at least one of the first parameter, the second parameter and the third parameter.

A linkage method according to embodiments of the present disclosure is executed by a main control device and includes: obtaining a first parameter of a first object model, a second parameter of a second object model and a third parameter of a third object model; and driving at least one of the object model device, the non-object model device and the main control device when a target parameter is changed or triggered, in which the target parameter is at least one of the first parameter, the second parameter and the third parameter, the object model device has the first object model, the main control device has the second object model, and the main control device constructs the third object model for the non-object model device.

A vehicle according to embodiments of the present disclosure includes a main control device, and the main control device is configured to execute a linkage method. The linkage method includes: obtaining a first parameter of a first object model, a second parameter of a second object model and a third parameter of a third object model; and driving at least one of the object model device, the non-object model device and the main control device when a target parameter is changed or triggered, in which the target parameter is at least one of the first parameter, the second parameter and the third parameter, the object model device has the first object model, the main control device has the second object model, and the main control device constructs the third object model for the non-object model device.

BRIEF DESCRIPTION OF DRAWINGS

The accompanying drawings, which are incorporated in the specification and constitute a part of the specification, illustrate embodiments consistent with the disclosure and together with the description, serve to explain principles of the disclosure.

FIG. 3 is a flowchart of steps of a linkage method according to an embodiment of the present disclosure.

FIG. 4 is a schematic structural diagram of a vehicle according to an embodiment of the present disclosure.

DETAILED DESCRIPTION

Figures 1, 2:
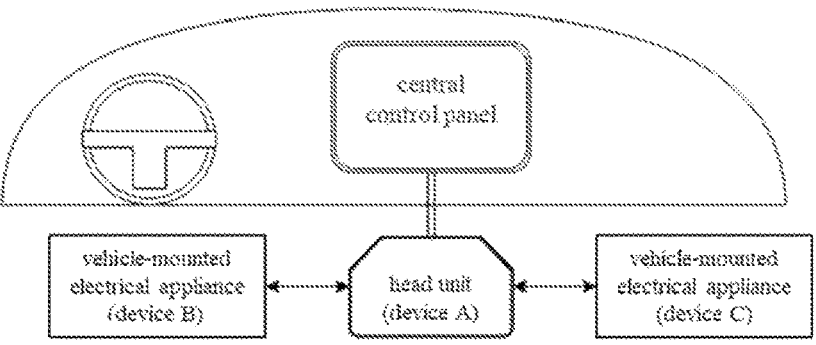
FIG. 1 is a schematic diagram of a linkage scenario according to an embodiment of the present disclosure.
FIG. 2 is a schematic structural diagram of a linkage system according to an embodiment of the present disclosure.

Here, illustrative embodiments will be described in detail, examples of which are shown in the accompanying drawings. When the following description refers to the drawings, unless otherwise indicated, the same numbers in different drawings indicate the same or similar elements. The implementations described in the following illustrative embodiments do not represent all the implementations consistent with the disclosure. Rather, they are merely examples of devices and methods consistent with some aspects of the present disclosure as detailed in the appended claims.

It should be noted that all the actions of obtaining signals, information or data in the disclosure are carried out under the premise of complying with the corresponding data protection laws and policies of the local country and obtaining authorization from the corresponding device owner.

In related art, protocols of some devices cannot be applied to some other devices, which will lead to failure of interconnection and linkage between these devices, and thus the related functions cannot be realized.

At present, in the linkage scenario, devices are interconnected to achieve related functions. For example, take the scene of the linkage between a head unit and a vehicle-mounted electrical appliance as an example. The vehicle-mounted electrical appliance is an electrical appliance installed on the vehicle, and the head unit is an inherent electrical appliance of the vehicle itself. With reference to FIG. 1, for example, after the vehicle-mounted electrical appliance (a device B or a device C in FIG. 1) is powered on, the vehicle-mounted electrical appliance is interconnected with the head unit. The vehicle-mounted electrical appliance can control an air conditioner temperature of the head unit, and the vehicle-mounted electrical appliance can also obtain a vehicle speed of the head unit and display it. However, there are three defects in this process:

In a first aspect, when the linkage function needs to be extended, the protocols of some devices may not be applicable to some other devices, which will lead to the failure of interconnection between these devices, and thus the linkage function cannot be realized. For example, if it is desired to extend the electric function of controlling the vehicle by a mouse or a keyboard, because the protocol of the keyboard or the mouse is not common with an object protocol of the head unit, the vehicle-mounted appliances such as the keyboard or the mouse cannot control the head unit, then the linkage system cannot be extended to the keyboard or the mouse, and its expansibility is poor.

In a second aspect, in order to realize a linkage function, it is necessary to extend the linkage between other devices and the current device, it is necessary to develop protocols in all the current device and the other devices, and the development cost is high.

In a third aspect, to realize different linkage functions, it is necessary to provide specific linkage protocols for linkage device, which means that each linkage function needs to be added with a specific linkage protocol for linkage device, which makes the linkage device not suitable for different linkage functions and has poor universality.

In view of this, the present disclosure proposes a linkage system. FIG. 2 is a structural schematic diagram of a linkage system according to an embodiment of the present disclosure. As shown in FIG. 2, the linkage system includes an object model device, a non-object model device and a main control device.

In some embodiments, the object model device is configured to model a function of the object model device to obtain a first object model with a first parameter.

In some examples, the object model device is a device that can realize object model modeling of its own functions. For example, the object model device can be a first type of vehicle-mounted electrical appliances that realize the object model modeling of their own functions. The first type of vehicle-mounted electrical appliances are electrical products that can be interconnected with vehicle head unit. The first type of vehicle-mounted electrical appliances includes a mobile phone and a remote controller, etc.

In some examples, different object model devices have different functions, for example, the mobile phone has a navigation function, and the remote controller has a temperature control function, a channel switching function or a volume adjustment function. The same object model device also has different functions. For example, the mobile phone has many different functions such as a navigation function, a voice function, a camera function and so on. Each function contains a method, a property and an event. When modeling the functions of the same object model device, the methods contained by the plurality of functions of the object model device are integrated, the properties contained by the plurality of functions of the object model device are integrated, and the events contained by the plurality of functions of the object model device are integrated, so that the first object model corresponding to the object model device can be constructed. It can be understood that different object model devices correspond to different first object models.

In some examples, the first object model is composed of methods, properties and events contained by a plurality of functions of the object model device, then the first parameter of the first object model can be at least one of the methods, the properties and the events, and the first object model can be used to describe what the object model device is, what it does and what responses it can provide to the outside world.

For example, the object model device is the remote controller. The remote controller has a function A and a function B, the function A includes a method A, an property A and an event A, and the function B includes a method B, an property B and an event B; the remote controller can integrate the method A and the method B, integrate the property A and the property B, and integrate the event C and the property C, and then construct the first object model. Then the first object model has the first parameters such as the method A, the property A and the event A, the method B, the property B and the event B. Of course, the first object model can describe what the remote controller is (property), what the remote controller can do (method) and what responses the remote controller can provide to the outside world (event) according to these first parameters.

In some embodiments, the non-object model device is a device that does not model its own functions.

In some examples, the non-object model device can be a second type of vehicle-mounted electrical appliances that do not model their own functions, and the second type of vehicle-mounted electrical appliances are electrical products that can be interconnected with the vehicle head unit, and the second type of vehicle-mounted electrical appliances include a mouse, a keyboard, a Bluetooth earphone and the like.

In some examples, the non-object model device can be a device interconnected with the main control device through a target connection protocol, including: a Bluetooth protocol, a WIFI protocol, an USB protocol, a CAN protocol, a LIN protocol, etc. For example, it can be a Bluetooth earphone interconnected with the head unit via a Bluetooth protocol, a mobile phone interconnected with the head unit via a WIFI protocol, a mouse, a keyboard, a power bank, an energy-saving lamps, an air purifier, etc. interconnected with the head unit via an USB protocol, a microphone, a reversing image system, a driving recorder, etc. interconnected with the head unit via a CAN protocol or a LIN protocol, which are not limited by this embodiment of the disclosure.

In some examples, the non-object model device models the function of the non-object model device itself through the main control device to obtain a third object model, and then participates in the linkage system proposed by embodiments of the disclosure.

In some embodiments, the main control device is configured to model the function of the main control device to obtain a second object model, and to model the function of the non-object model device to obtain a third object model; the second object model has a second parameter and the third object model has a third parameter.

In some examples, the main control device is a device that can realize object model modeling of its own functions, such as a vehicle or a vehicle head unit, which is a product or device of the vehicle itself, such as a window, an instrument panel, a vehicle air conditioner, etc.; the main control device can also be a control device for linkage control of the main control device, the object model device and the non-object model device.

In some examples, different main control devices have different functions, and the same main control device also has different functions, and each function includes a method, a property and an event. When modeling the functions of the same main control device, the second object model corresponding to the main control device can be constructed by integrating the methods, properties and events contained by a plurality of functions of the main control device. It can be understood that different main control devices correspond to different second object models.

In some examples, the second object model is composed of methods, properties and events contained by the plurality of functions of the main control device, then the second parameter of the second object model is at least one of the methods, properties and events, and the second object model can also be used to describe what the main control device is, what it does and what responses it provides to the outside world.

In some examples, because the non-object model device does not model its own functions, in order for the non-object model device to participate in the linkage system and link with the main control device and the object model device, the main control device can obtain the methods, properties and events of a plurality of functions of the non-object model device, and integrate these methods, properties and events respectively to construct a third object model, and the third parameter of the third object model has at least one of the methods, properties and events of the non-object model device. Thus, the non-object model device can be linked with the main control device and the object model device through the third object model.

In some examples, the target parameter is at least one of the first parameter, the second parameter and the third parameter, and each of the first parameter, the second parameter and the third parameter contains a method, an event and a property. Thus, when the main control device detects that the property of at least one of the first, second and third object models is changed, and/or the event of at least one of the first, second and third object models is triggered, at least one of the object model device, the non-object model device and the main control device can be driven to carry out linkage to realize linkage function.

It can be understood that linkage function refers to a function realized by linkage of at least two linkage devices, and the types of linkage devices can be at least one of the object model device, the non-object model device and the main control device.

In some examples, as shown in FIG. 2, in the linkage system, there may be at least one main control device, at least one object model device and at least one non-object model device, and each of the main control device, the object model device and the non-object model device has a plurality of functions.

In some embodiments, the main control device is further configured to obtain the first parameter, the second parameter and the third parameter prior to the main control device determining that at least one of the first parameter, the second parameter and the third parameter is changed or triggered.

In some examples, the main control device obtains the first parameter from the first object model, obtains the second parameter from the second object model and obtains the third parameter from the third object model.

In some examples, since the main control device cannot obtain the first parameter from the first object model of the object model device across devices, the object model device can map the first parameter of the first object model to a storage space of the main control device, and the main control device obtains the first parameter of the first object model from the storage space.

It can be understood that since the first object model is composed of the first parameter, mapping the first parameter of the first object model to the storage space of the main control device can also be regarded as mapping the first object model to the storage space of the main control device.

In some examples, since the non-object model device does not model its own function, the third object model obtained by the main control device after modeling the function of the non-object model device is stored in the storage space of the main control device. Then when the main control device obtains the third parameter, it can also obtain the third parameter of the third object model from its own storage space.

In some embodiments, the main control device is also configured to drive at least one of the object model device, the non-object model device and the main control device when the target parameter is changed or triggered.

In some examples, when any one of the first parameter of the first object model, the second parameter of the second object model and the third parameter of the third object model changes, the main control device may perform at least one of the following (1), (2) and (3):

(1) Call the First Parameter to Drive the Object Model Device.

For example, the main control device can call the methods and properties of the first object model to drive the object model device. For instance, the object model device is the remote controller, and the property of the first object model of the remote controller is an indicator light state. The main control device can call the property of the first object model to drive an indicator light of the remote controller to blink once.

In some examples, according to the different linkage functions to be realized, the main control device can drive the object model device, the non-object model device and the main control device, and can also drive the object model device and the non-object model device, or can only drive the object model device or the main control device, which is not limited by embodiments of the present disclosure.

(2) Call the Second Parameter to Drive the Main Control Device.

For example, the main control device can call the methods and properties of the second object model to drive the main control device itself. For instance, the main control device is a vehicle, the property of the second object model of the vehicle is window transparency, and the method is to adjust the window transparency. The main control device can call the method and property of the second object model to control the window transparency to decrease. (3) Call the third parameter to drive the non-object model device.

For example, the main control device can call the methods and properties of the third object model to drive the non-object model device. For instance, the non-object model device is an air purifier, the property of the third object model of the air purifier is humidity, and the method is to adjust the humidity. The main control device can call the method and property of the third object model to drive the air purifier to release gas for humidification. In some embodiments, the main control device is further configured to obtain a linkage rule from at least one of the object model device, the main control device and the cloud, and drive at least one of the object model device, the non-object model device and the main control device according to the linkage rule. It can be understood that different linkage rules are used to realize different linkage functions.

In some examples, the linkage rule refers to a rule configured to realize the linkage function, for example, when an event of a linkage device is triggered or a property of the linkage device is changed, the corresponding linkage device is controlled to perform a predetermined action. According to the linkage rule, the main control device call the parameters corresponding to different linkage devices such as the object model device, the non-object model device and the main control device, so as to realize the linkage function.

For example, if an automatic cooling function is to be realized, the linkage rule may be that when a temperature reaches a temperature threshold, at least one of the object model device, the non-object model device and the main control device is driven to realize the cooling function.

In some examples, the object model device may or may not store the linkage rule, and if the object model device stores the linkage rule, the main control device may obtain the linkage rule from the object model device.

In some examples, the main control device may or may not store the linkage rule, and if the main control device stores the linkage rule, the main control device may obtain the linkage rule from the main control device itself.

In some examples, if the linkage rule is stored in the cloud, a first correspondence between the linkage rule and the device identification of the object model device will also be stored in the cloud, and a second correspondence between the linkage rule and the device identification of the main control device will also be stored in the cloud. The main control device can obtain the linkage rule corresponding to the device identification of the object model device from the cloud according to the first correspondence, or can obtain the linkage rule corresponding to the device identification of the main control device from the cloud according to the second correspondence.

In some embodiments, a linkage engine is arranged in the main control device, and the linkage engine is configured to realize a control function of the main control device.

In some examples, the linkage engine can drive at least one of the object model device, the non-object model device and the main control device when the target parameter is changed or triggered.

In some examples, the linkage engine can obtain the first parameter, the second parameter and the third parameter. For example, the linkage engine can obtain the first parameter of the first object model mapped by the object model device in the storage space from the storage space of the main control device, and the linkage engine can also obtain the third parameter of the third object model from the storage space of the main control device.

In some examples, the linkage engine can perform at least one of the following when the target parameter is changed or triggered: calling the first parameter to drive the object model device; calling the second parameter to drive the main control device; or calling the third parameter to drive the non-object model device.

In some examples, the linkage engine can obtain a linkage rule from at least one of the object model device, the main control device and the cloud; and drive at least one of the object model device, the non-object model device and the main control device according to the linkage rule.

In some examples, in the linkage system proposed by embodiments of the present disclosure, the method is usually used to describe capability or method that the linkage device can be called externally. For example, the method is to adjust a temperature of an air conditioner, to adjust degree of opening of a window, to adjust brightness of a light, etc. The property is used to describe state of the linkage device, such as the temperature of the air conditioner, state of the window, state of the light, etc. The event is used to describe an event that the linkage device responds to. For example, when the temperature reaches the temperature threshold, one event is triggered, and when the humidity is less than the humidity threshold, another event is triggered.

In some scenarios, the main control device is a vehicle, the object model device is a remote controller, and the non-object model device is an air purifier. The remote controller has a first object model, the vehicle has a second object model, and the vehicle constructs a third object model for the air purifier. The property of the first object model of the remote controller is the state of the indicator light, there is no method, and the event is a temperature adjustment button "+" or a temperature adjustment button "−". The property of the second object model of the vehicle is the temperature of the air conditioner, the method is to adjust the temperature, and the event is that the temperature inside the vehicle reaches the temperature threshold. The property of the third object model constructed by the vehicle for the air purifier is the humidity of the air purifier, the method is to adjust the humidity, and the event is that the humidity inside the vehicle is less than a predetermined value.

When the user presses the adjustment button "−" of the remote controller, the vehicle detects that the event of the first object model of the remote controller is triggered, and at this time, the vehicle will call the method and property of the second object model of the vehicle itself to drive the air conditioner to lower the temperature. The vehicle will also call the method and property of the third object model of the air purifier to increase the air humidity. The vehicle will also call the property of the remote controller to adjust the state of the indicator light of the remote controller. Finally, the functions of cooling the interior of the vehicle, increasing humidity and prompting the user are realized.

In other scenarios, the main control device is a vehicle, and the non-object model device is an air conditioner. The property of the second object model of the vehicle is the window transparency, the method is to adjust the window transparency, and the event is that the temperature inside the vehicle reaches the threshold. The property of the third object model constructed by the vehicle for the air conditioner is temperature, the method is to adjust the temperature, and the event is that the temperature inside the vehicle reaches the threshold.

When the vehicle detects that the temperature inside the vehicle reaches the threshold, the vehicle will call the method and property of the second object model of the vehicle to reduce the window transparency, and the vehicle will also call the method and property of the air conditioner, and drive the temperature of the air conditioner to decrease, to achieve the function of automatic cooling.

Through the technical scheme, the main control device can drive at least one linkage device among the object model device, the non-object model device and the main control device when the main control device detects that at least one of the first parameter of the first object model, the second parameter of the second object model and the third parameter of the third object model is changed or triggered, to realize the linkage function through the linkage of at least two of the three linkage devices. It may also means that the main control device may perform combined drive on any interconnected main control device, object model device and non-object model device, to realize the linkage function.

In the first aspect, for the object model device, the main control device can directly call the first object model of the object model device to drive the object model device; for the non-object model device, the main control device can construct the third object model for it, and then call the third object model to drive the non-object model device. In this way, the main control device can realize linkage with at least one of the object model device and the non-object model device, and there is no situation that linkage cannot occur. The linkage system proposed in embodiments of the present disclosure can also be extended to any object model device and non-object model device, with high expansibility.

In the second aspect, when realizing the newly added linkage function, it is not necessary to develop protocols in the object model device, the non-object model device and the main control device respectively, but a linkage rule can be added in the object model device or the main control device. Thus the main control device can drive at least one of the object model device, the non-object model device and the main control device to link according to the linkage rule, and then the newly added linkage function is realized, so that the development cost is relatively low.

In the third aspect, the main control device can drive at least one of the object model device, the non-object model device and the main control device according to the linkage rules to realize different linkage functions without adding specific linkage protocols for the linkage devices such as the object model device, the non-object model device, and the main control device, and the linkage devices can be suitable for different linkage functions, with high universality.

FIG. 3 is a flowchart of steps of a linkage method according to an embodiment of the present disclosure. As shown in FIG. 3, the linkage method is performed by a main control device, and the linkage method includes the following steps:

At step S301, the first parameter of the first object model, the second parameter of the second object model and the third parameter of the third object model are obtained.

At step S302, when a target parameter is changed or triggered, at least one of the object model device, the non-object model device and the main control device is driven, the target parameter includes at least one of the first parameter, the second parameter and the third parameter, and the object model device has the first object model, the main control device has the second object model, and the main control device constructs the third object model for the non-object model device.

In some embodiments, step S302 includes performing at least one of the following when the target parameter is changed or triggered:

calling the first parameter to drive the object model device;

calling the second parameter to drive the main control device; or calling the third parameter to drive the non-object model device.

In some embodiments, a linkage rule is obtained from at least one of the object model device, the main control device and the cloud; and at least one of the object model device, the non-object model device and the main control device is driven according to the linkage rule.

In embodiments of the present disclosure, the optional implementation of step S301 can refer to the optional implementation of obtaining the first parameter, the second parameter and the third parameter in the above-described linkage system, and the optional implementation of step S302 can refer to the optional implementation of driving at least one of the object model device, the non-object model device and the main control device in the above-mentioned linkage system, which is not repeated here.

FIG. 4 is a block diagram of a vehicle 600 according to an embodiment of the present disclosure. For example, the vehicle 600 may be a hybrid vehicle, a non-hybrid vehicle, an electric vehicle, a fuel cell vehicle or other types of vehicles. The vehicle 600 may be an autonomous vehicle, a semi-autonomous vehicle or a non-autonomous vehicle.

Referring to FIG. 4, the vehicle 600 may include various subsystems, such as an infotainment system 610, a sensing system 620, a decision control system 630, a drive system 640, and a computing platform 650. The vehicle 600 may also include more or less subsystems, and each subsystem may include a plurality of components. In addition, each subsystem and each component of the vehicle 600 can be interconnected by wired or wireless means.

In some embodiments, the infotainment system 610 may include a communication system, an entertainment system, a navigation system and the like.

The sensing system 620 may include several sensors for sensing information of the environment around the vehicle 600. For example, the sensing system 620 may include a global positioning system (the global positioning system may be a GPS system, a Beidou system or other positioning systems), an inertial measurement unit (IMU), a lidar, a millimeter-wave radar, an ultrasonic radar and a camera device.

The decision control system 630 may include a computing system, a whole vehicle controller, a steering system, a throttle and a braking system.

The drive system 640 may include components that provide power for the vehicle 600. In one embodiment, the drive system 640 may include an engine, an energy source, a transmission system and wheels. The engine can be one or a combination of internal combustion engine, electric motor and air compression engine. The engine can convert the energy provided by the energy source into mechanical energy.

Some or all functions of the vehicle 600 are controlled by the computing platform 650. The computing platform 650 may include at least one processor 651 and a memory 652, and the processor 651 may execute instructions 653 stored in the memory 652.

The processor 651 may be any conventional processor, such as a commercially available CPU. For example, the processor may also include a Graphic Process Unit (GPU), a Field Programmable Gate Array (FPGA), a System on Chip (SOC), an application specific integrated circuit (ASIC) or a combination thereof.

The memory 652 can be realized by any type of volatile or nonvolatile memory device or their combination, such as static random access memory (SRAM), electrically erasable programmable read-only memory (EEPROM), erasable programmable read-only memory (EPROM), programmable read-only memory (PROM), read-only memory (ROM), magnetic memory, flash memory, magnetic disk or optical disk.

In addition to the instructions 653, the memory 652 can also store data, such as road map, route information, vehicle position, direction, speed and other data. The data stored in the memory 652 can be used by the computing platform 650.

In embodiments of the present disclosure, the processor 651 may execute the instructions 653 to complete all or part of the steps of the linkage method described above.

Embodiments of the present disclosure also provide a computer-readable storage medium, on which computer program instructions are stored, and when the program instructions are executed by a processor, the steps of the linkage method provided by the present disclosure are realized.

Embodiments of the present disclosure also provide an Integrated Circuit (IC) or chip. The integrated circuit can be an IC or a collection of a plurality of ICs; the chip may include, but is not limited to, the following types: a GPU (Graphics Processing Unit), a CPU (Central Processing Unit), a FPGA (field programmable gate array, Programmable logic array), a DSP (Digital Signal Processor), an ASIC (application specific integrated circuit), a SoC (System on Chip), etc. The integrated circuit or chip can be used to perform executable instructions (or codes) to realize the above-described linkage method. The executable instructions can be stored in the integrated circuit or chip, and can also be obtained from other equipment or devices. For example, the integrated circuit or chip includes a processor, a memory, and an interface for communicating with other devices. The executable instructions can be stored in the memory, and when the executable instructions are executed by the processor, the linkage method described above is realized; alternatively, the integrated circuit or chip can receive executable instructions through the interface and transmit them to the processor for execution, to realize the linkage method described above.

In a further embodiment of the present disclosure, a computer program product is also provided, which includes a computer program executable by a programmable device, and the computer program has a code portion for executing the linkage method described above when executed by the programmable device.

According to a first aspect of embodiments of the present disclosure, a linkage system is provided, which includes an object model device, a non-object model device and a main control device; the object model device is configured to model a function of the object model device to obtain a first object model, and the first object model has a first parameter; the main control device is configured to model a function of the main control device to obtain a second object model, and model a function of the non-object model device to obtain a third object model; the second object model has a second parameter, and the third object model has a third parameter; the main control device is further configured to drive at least one of the object model device, the non-object model device and the main control device when a target parameter is changed or triggered; the target parameter is at least one of the first parameter, the second parameter and the third parameter.

In some examples, the main control device is further configured to obtain the first parameter, the second parameter and the third parameter.

In some examples, the main control device driving at least one of the object model device, the non-object model device and the main control device, including: the main control device performs at least one of the following when the target parameter is changed or triggered: calling the first parameter to drive the object model device; calling the second parameter to drive the main control device; or calling the third parameter to drive the non-object model device.

In some examples, the main control device is further configured to drive at least one of the object model device, the non-object model device and the main control device according to a linkage rule when the target parameter is changed or triggered; in which the main control device obtains the linkage rule from at least one of the object model device, the main control device and a cloud, and changes or triggers of different target parameters correspond to different linkage rules.

In some examples, the main control device further includes a linkage engine, and the linkage engine is configured to execute a control method for the linkage system of any one of the above optional embodiments.

In some examples, the object model device is further configured to map the first parameter of the first object model to a storage space of the main control device.

In some examples, the main control device is further configured to obtain the first parameter from the storage space of the main control device.

In some examples, each of the first parameter, the second parameter and the third parameter includes at least one of the following: a method, a property and an event.

According to a second aspect of embodiments of the present disclosure, a linkage method is provided, which is executed by a main control device and includes: obtaining a first parameter of a first object model, a second parameter of a second object model and a third parameter of a third object model; and driving at least one of the object model device, the non-object model device and the main control device when a target parameter is changed or triggered, in which the target parameter is at least one of the first parameter, the second parameter and the third parameter, the object model device has the first object model, the main control device has the second object model, and the main control device constructs the third object model for the non-object model device.

In some examples, driving at least one of the object model device, the non-object model device and the main control device when the target parameter is changed or triggered includes: performing at least one of the following when the target parameter is changed or triggered: calling the first parameter to drive the object model device; calling the second parameter to drive the main control device; or calling the third parameter to drive the non-object model device.

In some examples, the method further includes: obtaining a linkage rule from at least one of the object model device, the main control device and a cloud; and driving at least one of the object model device, the non-object model device and the main control device according to the linkage rule.

According to a third aspect of embodiments of the present disclosure, a vehicle is provided, which includes a main control device, and the main control device is configured to execute steps of a linkage method provided by the second aspect of embodiments of the present disclosure.

According to a fourth aspect of embodiments of the present disclosure, a computer-readable storage medium is provided, on which computer program instructions are stored, and when executed by a processor, the program instructions carry out steps of a linkage method provided in the second aspect of the present disclosure.

According to a fifth aspect of embodiments of the present disclosure, a chip is provided, which includes a processor and an interface; the processor is configured to read instructions to execute steps of a linkage method provided in the second aspect of the present disclosure.

The technical solutions provided by embodiments of the present disclosure can include the following beneficial effects:

For the object model device, the main control device can directly call the first object model of the object model device to drive the object model device; for the non-object model device, the main control device can construct the third object model for it, and then call the third object model to drive the non-object model device. In this way, the main control device can realize linkage with at least one of the object model device and the non-object model device, and there is no situation that linkage cannot occur. The linkage system proposed in embodiments of the present disclosure can also be extended to any object model device and non-object model device, with high expansibility.

Other embodiments of the present disclosure will easily occur to those skilled in the art after considering the specification and practicing the present disclosure. The disclosure is intended to cover any variations, uses or adaptations of the disclosure, which follow the general principles of the disclosure and include common knowledge or conventional technical means in the art that are not disclosed in the disclosure. The specification and embodiments are to be regarded as exemplary only, with the true scope and spirit of the disclosure being indicated by the following claims.

It should be understood that the present disclosure is not limited to the precise structure described above and shown in the drawings, and various modifications and changes can be made without departing from its scope. The scope of the present disclosure is limited only by the appended claims.

What is claimed is:

1. A linkage system for a vehicle, comprising:

an object model device configured to model a function of the object model device to obtain a first object model, and the first object model having a first parameter, a non-object model device, and a main control device configured to model a function of the main control device to obtain a second object model, and model a function of the non-object model device to obtain a third object model; the second object model having a second parameter, and the third object model having a third parameter;

wherein the main control device is further configured to monitor the first parameter, the second parameter, and the third parameter and drive at least one of the object model device according to a linkage rule, the non-object model device and the main control device in response to determining that a target parameter is changed or triggered, such that the main control device realizes linkage with at least one of the object model device and the non-object model device;

wherein the target parameter is at least one of the first parameter, the second parameter and the third parameter; the first parameter is mapped by the object model device to a storage space of the main control device, the second parameter and the third parameter are stored by the main control device in the storage space of the main control device, and the first parameter, the second parameter, and the third parameter are obtained by the main control device from the storage space of the main control device; and wherein the main control device is an inherent electrical appliance of the vehicle that can realize object model modeling of its own functions, the object model device is a vehicle-mounted device that can realize object model modeling of its own functions, and the non-object model device is a vehicle-mounted device that does not model its own functions.

2. The linkage system according to claim 1, wherein in response to determining that the target parameter is changed or triggered, the main control device is configured to perform at least one of:

calling the first parameter to drive the object model device;

calling the second parameter to drive the main control device; or calling the third parameter to drive the non-object model device.

3. The linkage system according to claim 1, wherein:

the main control device is configured to obtain the linkage rule from at least one of the object model device, the main control device and a cloud, and changes or triggers of different target parameters correspond to different linkage rules.

4. The linkage system according to claim 3, wherein the linkage rule is stored in the cloud, a first correspondence between the linkage rule and a device identification of the object model device is stored in the cloud, and a second correspondence between the linkage rule and a device identification of the main control device is stored in the cloud; and the main control device is configured to obtain the linkage rule corresponding to the device identification of the object model device from the cloud according to the first correspondence, or obtain the linkage rule corresponding to the device identification of the main control device from the cloud according to the second correspondence.

5. The linkage system according to claim 1, wherein the main control device further comprises a linkage engine, and the linkage engine is configured to drive at least one of the object model device, the non-object model device and the main control device according to the linkage rule in response to determining that the target parameter is changed or triggered.

6. The linkage system according to claim 5, wherein the linkage engine is configured to obtain the first parameter, the second parameter and the third parameter.

7. The linkage system according to claim 5, wherein in response to determining that the target parameter is changed or triggered, the linkage engine is configured to perform at least one of:

calling the first parameter to drive the object model device;

calling the second parameter to drive the main control device; or calling the third parameter to drive the non-object model device.

8. The linkage system according to claim 5, wherein the linkage engine is configured to obtain the linkage rule from at least one of the object model device, the main control device and a cloud; and drive at least one of the object model device, the non-object model device and the main control device according to the linkage rule.

9. The linkage system according to claim 1, wherein each of the first parameter, the second parameter and the third parameter comprises at least one of: a method, a property or an event.

10. The linkage system according to claim 1, wherein the third object model constructed by the main control device is stored in a storage space of the main control device.

11. The linkage system according to claim 1, wherein the object model device has a plurality of functions, each of the plurality of functions contains a method, a property and an event; and modeling the plurality of functions of the object model device is carried out by integrating the methods contained by the plurality of functions of the object model device, integrating the properties contained by the plurality of functions of the object model device, and integrating the events contained by the plurality of functions of the object model device, to obtain the first object model corresponding to the object model device.

12. A linkage method, executed by a main control device of a vehicle, comprising:

monitoring a first parameter of a first object model, a second parameter of a second object model and a third parameter of a third object model; and driving at least one of an object model device, a non-object model device and the main control device according to a linkage rule in response to determining that a target parameter is changed or triggered, such that the main control device realizes linkage with at least one of the object model device and the non-object model device, wherein the target parameter is at least one of the first parameter, the second parameter and the third parameter, the object model device has the first object model, the main control device has the second object model, and the main control device constructs the third object model for the non-object model device; the first parameter is mapped by the object model device to a storage space of the main control device, the second parameter and the third parameter are stored by the main control device in the storage space of the main control device, and the first parameter, the second parameter, and the third parameter are obtained by the main control device from the storage space of the main control device; and wherein the main control device is an inherent electrical appliance of the vehicle that can realize object model modeling of its own functions, the object model device is a vehicle-mounted device that can realize object model modeling of its own functions.

13. The method according to claim 12, wherein driving at least one of the object model device, the non-object model device and the main control device according to the linkage rule in response to determining that a target parameter is changed or triggered, comprises:

performing at least one of the following in response to determining that the target parameter is changed or triggered:

calling the first parameter to drive the object model device;

calling the second parameter to drive the main control device; or calling the third parameter to drive the non-object model device.

14. The method according to claim 12, further comprising:

obtaining the linkage rule from at least one of the object model device, the main control device and a cloud; and driving at least one of the object model device, the non-object model device and the main control device according to the linkage rule.

15. A vehicle, comprising:

a main control device configured to execute a linkage method comprising:

monitoring a first parameter of a first object model, a second parameter of a second object model and a third parameter of a third object model; and driving at least one of an object model device, a non-object model device and the main control device according to a linkage rule in response to determining that a target parameter is changed or triggered, such that the main control device realizes linkage with at least one of the object model device and the non-object model device, wherein the target parameter is at least one of the first parameter, the second parameter and the third parameter, the object model device has the first object model, the main control device has the second object model, and the main control device constructs the third object model for the non-object model device; the first parameter is mapped by the object model device to a storage space of the main control device, the second parameter and the third parameter are stored by the main control device in the storage space of the main control device, and the first parameter, the second parameter, and the third parameter are obtained by the main control device from the storage space of the main control device; and wherein the main control device is an inherent electrical appliance of the vehicle that can realize object model modeling of its own functions, the object model device is a vehicle-mounted device that can realize object model modeling of its own functions, and the non-object model device is a vehicle-mounted device that does not model its own functions.

16. The vehicle according to claim 15, wherein driving at least one of the object model device, the non-object model device and the main control device according to the linkage rule in response to determining that a target parameter is changed or triggered, comprises:

performing at least one of the following in response to determining that the target parameter is changed or triggered:

calling the first parameter to drive the object model device;

calling the second parameter to drive the main control device; or calling the third parameter to drive the non-object model device.

17. The vehicle according to claim 15, wherein the linkage method further comprises:

obtaining the linkage rule from at least one of the object model device, the main control device and a cloud; and driving at least one of the object model device, the non-object model device and the main control device according to the linkage rule.

* * * * *